Nov. 30, 1937.  H. D. GEYER  2,100,643
RADIO ANTENNA FOR AUTOMOBILES
Filed Sept. 9, 1935   2 Sheets-Sheet 1
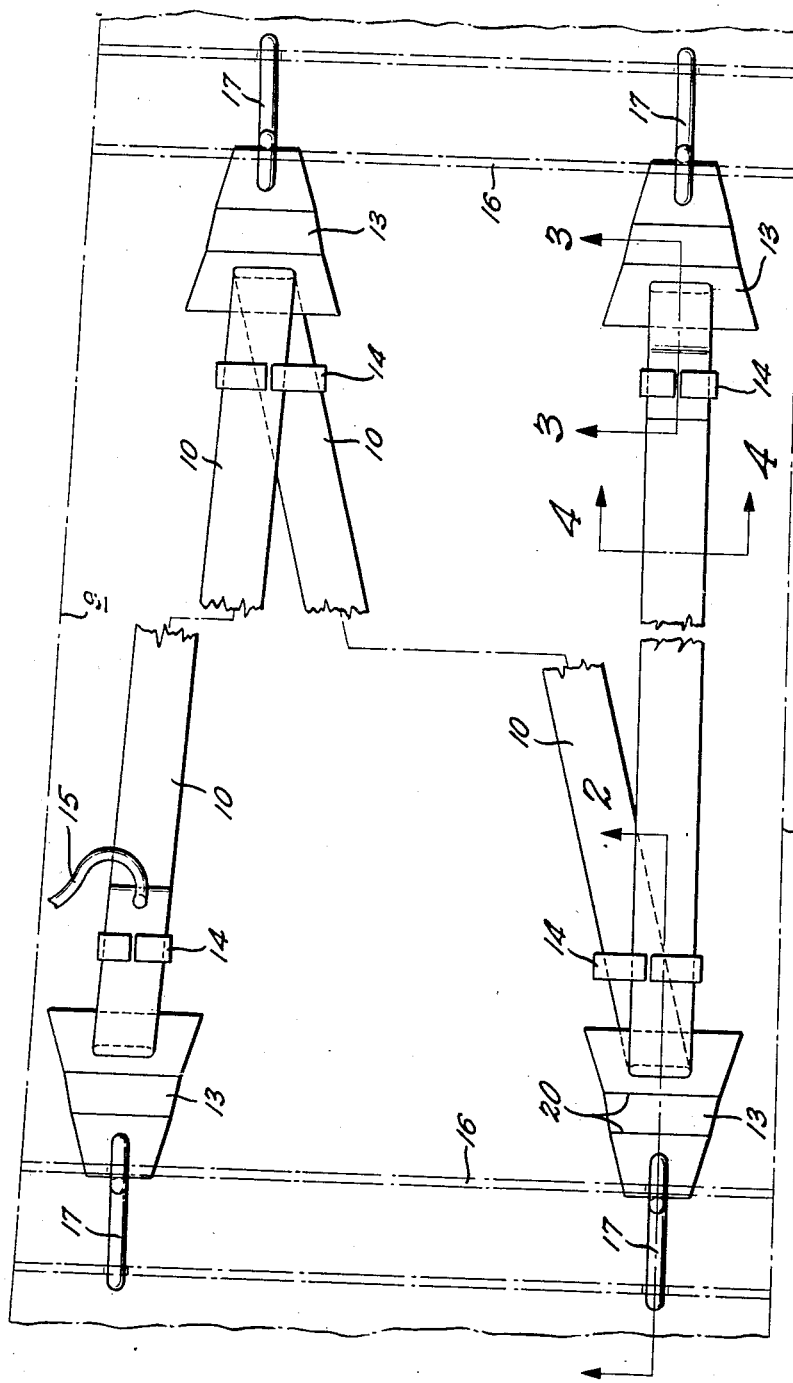
INVENTOR
Harvey D. Geyer
BY
Spencer Hardman & Fehr
HIS ATTORNEYS Nov. 30, 1937. H. D. GEYER 2,100,643
RADIO ANTENNA FOR AUTOMOBILES
Filed Sept. 9, 1935 2 Sheets-Sheet 2

INVENTOR
Harvey D. Geyer
BY
Spencer Hardman & Fehr
HIS ATTORNEYS

Patented Nov. 30, 1937

2,100,643

UNITED STATES PATENT OFFICE 2,100,643

RADIO ANTENNA FOR AUTOMOBILES

Harvey D. Geyer, Dayton, Ohio, assignor to General Motors Corporation, Detroit, Mich., a corporation of Delaware Application September 9, 1935, Serial No. 39,712

6 Claims. (Cl. 250—33)

This invention relates to radio antennas designed especially for efficient mounting upon automobiles quite near the ground such as under the running board thereof.

An object of this invention is to provide an efficient antenna which is inexpensive to make and very simply and easily installed at a suitable constantly spaced distance from an automobile running board.

An important feature of the antenna of this invention is that it is very strong and durable and not easily damaged by flying rocks or obstructions over which the automobile may pass and which will not accumulate foreign matter such as dirt, water, ice, snow etc. This is due to the desired antenna effect being obtained by using a relatively few laterally spaced reaches of a strong flat metal strip rather than by providing the necessary antenna surface by using a wide flat metal plate or by means of a much greater number of small metal wires or wire network. Such strong metal strips are very simply resiliently fastened under the running board in suitably laterally spaced relation and since these strips run essentially longitudinally with the running board and not cross-wise thereof there is much less chance of their catching upon any raised obstruction over which the automobile may pass.

Another object of the invention is to provide an automobile antenna which is completely physically protected and electrically insulated with resilient water-repellant rubber whereby it retains a minimum of sand, mud, water or snow thrown thereupon and hence will have a substantial constant capacity under all conditions and will continue to provide good electrical performance.

The rubber covering also protects the metal antenna against physical damage by flying sand or rocks or other road hazards.

Further objects and advantages of the present invention will be apparent from the following description, reference being had to the accompanying drawings wherein a preferred embodiment of the present invention is clearly shown.

In the drawings:

Fig. 1 is a plan view of a completely assembled antenna secured in place upon the under side of the left running board of an automobile, the central portions of the antenna being broken away in order to show the parts on a larger scale.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 shows a plan view of one end of the antenna assembly with all the parts necessary in the attachment of the antenna to the automobile.

Fig. 6 is a side view of Fig. 5 with a portion thereof taken in section in line 6—6 of Fig. 5.

Similar reference characters refer to similar parts throughout the several views.

Figure 5:
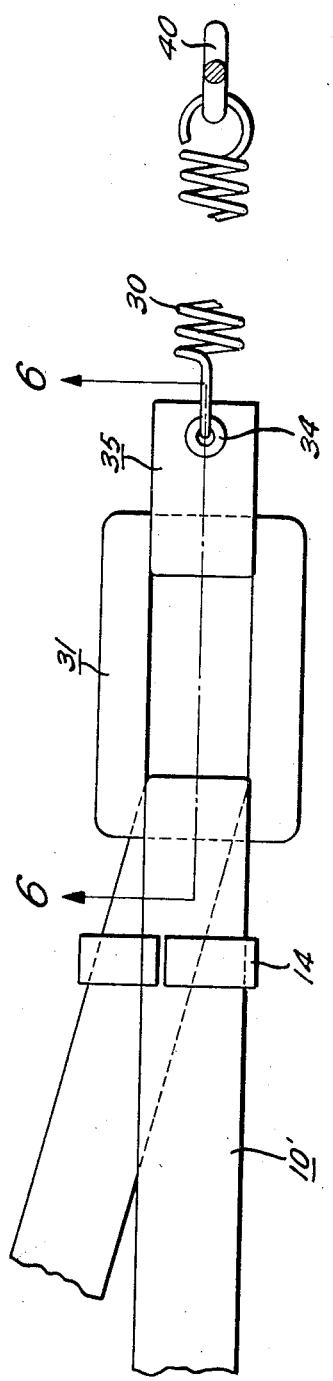
Figs. 5 and 6 show a modied form of this invention.

In the forms shown in Figs. 1 to 4 the antenna 10 consists of a relatively strong flat strip of metal, preferably steel or brass, of the desired length, completely encased in a water-repellent soft rubber covering 11, as shown in Fig. 4. A steel strip one hundredth inch thick by three quarter inch wide is suitable. This part is preferably made in continuous lengths by extruding a coating of uncured soft rubber compound containing a wax, such as paraffin, upon the metal strip 10 and thereafter properly curing the rubber in a vulcanizing chamber. This strip may be cut to the required lengths either before or after curing the rubber covering 11. The wax in the rubber forms a water-repellent outer surface on the antenna strip during use. If desired in some cases, the rubber sheath may first be prepared and cured and the metal strip inserted afterward but this is not the preferred way of making the antenna strip. If desired the metal antenna may be a flat braided wire ribbon or woven metal strip, or other types of metal strips may be used so long as they are strong and flexible and capable of being threaded through the supports as hereinafter described.

The antenna proper thus prepared has one end thereof threaded through a suitable slot 12 in the resilient insulating support 13 and has its projecting end doubled back upon itself and firmly clamped in place by the small metal clamp 14 as clearly shown in Fig. 3. The other end of the antenna 10 is then threaded successively through slots 12 in the other insulator supports 13 and its other end may be suitably electrically attached to a suitably shielded lead-in wire 15 which runs to the radio receiving set in the automobile. The four insulators 13 shown in Fig. 1 are attached to the front and rear hangers 16 for the running board (shown in plan outline at 9) by the metal hooks 17 as clearly shown in Fig. 2. These hooks 17 each have an upturned hook 18 at one end which is simply slipped through a hole 19 in the metal hanger 16 and held in place therein by the tension in the resilient insulators 13. The other end of each hook 17 is so shaped that when it is inserted through an aperture in the insulator the turned-up end 21 thereof more securely retains the insulator 13 against slipping out of place. These hooks 17 are so shaped as to properly space the antenna from the metal running board thereabove to which the set is ordinarily grounded, and from the road surface therebelow and thus provide the maximum antenna effect for radio reception and still provide sufficient road clearance.

It will be noted that the antenna of this invention may be first completely assembled with the resilient insulators 13 and hooks 17 prior to attaching any parts to the running board or other parts of the automobile. This assembly may then be easily and quickly secured to the automobile simply by inserting the hooked ends 18 of hooks 17 into the holes 19 of the metal hanger 16 at one end of the running board, and then by slightly stretching the resilient connectors 13 the hooks 17 may be similarly inserted into the holes 19 at the opposite end of the running board. The tension remaining in the connectors 13 thereafter keeps all the antenna strips 10 uniformly stretched between the two hangers 16 and so prevents sagging of the strips 10 and rattling of the hooks 17 and the vibration thereof will shake off all mud, water, ice, or snow. The resilient connectors 13 are preferably of wax-containing resilient rubber reinforced by pieces of heavy fabric 20 vulcanized to the rubber so as to strengthen same at the end portions thereof and prevent the hooks 17 or antenna strip 10 from tearing out their holes. The central portion of connectors 13 preferably has no fabric so that the rubber may stretch more readily under tension. Thus connectors 13 provide very efficient water-repellant electric insulator supports for the antenna strip 10 and at the same time serve as the tension springs therefor.

This antenna assembly may be easily made longer or shorter to suit any length running board simply by using a greater or less length of antenna strip 10 when the same is assembled, all the other parts remaining exactly the same. Also instead of providing the three reaches of antenna strip 10 shown in Fig. 1 from the front to the rear hanger 16, only one or two reaches may readily be provided under each running board simply by assembling the stock parts 10, 13, 14, and 17 accordingly. Suitably located holes 19 may be easily drilled in the hangers 16 to properly locate the various reaches of the antenna strip 10 without any other change in the running board. The reach adjacent the outer edge of the running board is the least shielded by the car body hence provides the greatest antenna effect.

The form of the invention shown in Figs. 5 and 6 will now be described. In this form the relatively wide flat antenna strip 10' is supported by metal coil tension springs 30 and non-metallic spacer insulators 31 of sufficient length to properly space the ends of the antenna strip 10' from the metal springs 30 so as to avoid the harmful electrical effect due to the antenna proper being too close at any point to grounded metal parts. These spacer insulators 31 are preferably made of rubber, either soft or hard rubber, with reinforcing fabric cords 32 in the center so that the ring insulator 31 will stand a tension load of about 100 pounds. The rubber of the spacer insulators 31 preferably is compounded with a sufficient amount of a suitable wax, such as paraffin, which will exude from the finished rubber insulator and form a moisture repellant film on its outer surface at all times, which serves to keep these insulators 31 free of water film at all times regardless of the amount of water which may splash thereagainst during use. Heretofore it has been extremely difficult to properly protect a radio antenna supported under the running board or anywhere near the ground under an automobile from the very harmful effects of water being splashed against the antenna insulators since any change in the degree of insulation greatly changes the capacity of the antenna. It has been found that the above described non-metallic rubber and fabric insulators 31 containing wax compounded with the rubber solves this water problem in a remarkably efficient manner.

Figure 6:
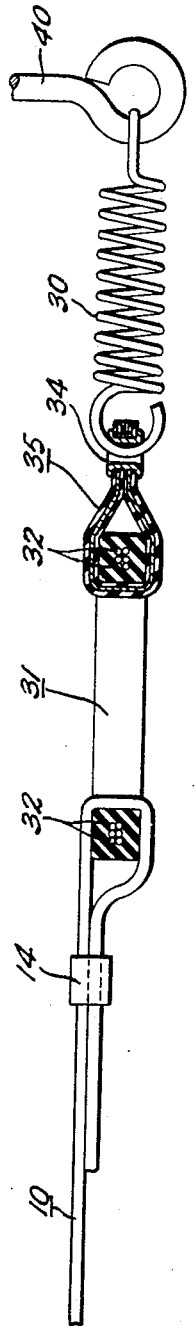

Preferably, but not necessarily, these non-metallic insulators are made in the form of a ring so that the antenna strip 10' may be readily threaded therethrough at one end thereof and a spring attachment loop 35 threaded therethrough at the other end, as clearly shown in Figs. 5 and 6. The attachment loop 35 preferably is a rubber covered flat strip of metal having its ends clamped together by a small metal grommet 34 having a hole therethrough through which the end of tension spring 31 may be easily hooked. It is very convenient to use a short length of the rubber-covered antenna strip 10' from which to make the attachment loop 35, since both of these will then be of the same width and fit neatly within the spacer insulator 31.

This form of antenna may first be completely assembled with the springs 30 and then be suitably attached to the under side of the running board in the manner described for the first form. The outer ends of springs 30 may be simply hooked into holes in the running board hangers 16, as above described, or if desired, depending vertically adjustable brackets 40 may be provided for supporting the outer ends of springs 30, as shown in Figs. 5 and 6. The coil tension springs 30 are of sufficient strength to maintain the antenna against sagging in the middle but will yield if anything strikes the antenna and so minimize the possibility of the antenna being torn loose or broken.

While it is preferable that the antenna strip proper be fully insulated with the above described water-repellant rubber covering 11, it has been found that the antenna of this invention works very well if a bare metal strip be used provided the ends thereof be properly insulated with water-repellant insulators in spaced relation with its end supports as described in the above two forms. The strength and ruggedness of construction of the entire antenna assembly permit it to survive very rough treatment, and its water-repellant properties maintain its electrical capacity substantially constant even though water, mud, ice or snow be splashed all over it.

While the embodiment of the present invention as herein disclosed, constitutes a preferred form, it is to be understood that other forms might be adopted, all coming within the scope of the claims which follow.

What is claimed is as follows:

1. A radio receiving antenna for automobiles mounted thereon near the road surface, said antenna comprising: a flexible harness-like structure having end attachment insulators and a flexible rubber-coated flat metal strip looped back and forth between said attachment insulators and forming a plurality of substantially longitudinally-extending laterally-spaced reaches and providing open spaces between said reaches to minimize the retention of water, mud, or other foreign matter upon said antenna and the harmful capacity effect of such retention.

2. A radio receiving antenna for automobiles mounted thereon near the road surface, said antenna comprising: a flexible harness-like structure having a plurality of laterally-spaced attachment insulators at each opposed end thereof and a flexible rubber-coated flat metal strip looped back and forth between said attachment insulators and thereby forming a plurality of substantially longitudinally-extending laterally-spaced reaches having open spaces therebetween.

3. A radio receiving antenna for automobiles mounted thereon near the road surface, said antenna comprising: a flexible harness-like structure having attachment insulators at its opposed ends and a flexible flat metal strip individually coated with a water-repellant rubber coating and looped back and forth between said attachment insulators and forming a plurality of longitudinally-extending laterally-spaced reaches, said reaches being retained in substantially horizontal position by longitudinal tension thereon.

4. A radio receiving antenna for automobiles mounted thereon near the road surface, said antenna comprising: a unitary flexible structure having attachment insulators at its two opposed ends and a continuous flexible flat metal strip individually coated thruout its length with a water-repellant rubber coating, said rubber-coated metal strip stretching back and forth between said attachment insulators and forming a plurality of longitudinal laterally-spaced reaches, each of said reaches of said continuous metal strip being connected to one of said attachment insulators at each opposed end thereof and held taut by said insulators.

5. In combination with an automotive vehicle, a radio antenna mounted upon the vehicle in such proximity to the road that it is subject to the harmful effects of rocks, gravel, sand, water, mud, or snow thrown against the antenna by the road wheels of the vehicle, said antenna comprising: a plurality of spaced attachment insulators secured to said vehicle, a continuous flexible relatively flat metal strip individually coated thruout its length with a water-repellant rubber coating of substantial thickness, said continuous strip stretching to and fro between said attachment insulators and forming a plurality of laterally-spaced reaches held in a taut horizontal position by longitudinal tension in each of said reaches, said rubber coating serving to insulate and protect said metal strip against physical damage by flying rocks, gravel or sand and also serving to substantially prevent adherence of a water film from water splashed thereagainst from the road.

6. In combination with an automotive vehicle, a radio antenna mounted upon the vehicle in such proximity to the road that it is subject to the harmful effects of rocks, gravel, sand, water, mud, or snow thrown against the antenna by the road wheels of the vehicle, said antenna comprising: a main antenna element of metal held stretched in substantially taut condition between two opposed non-metallic flexible supporting spacer links, said spacer links comprising resilient rubber reinforced with interior substantially non-stretchable fabric cords, said cords extending in the direction of and carrying the tension on the main antenna element whereby said spacer links will sustain said main element taut over a long period of use without material sag therein.

HARVEY D. GEYER.